United States Patent [19]
Guipaud

[11] Patent Number: 4,527,524
[45] Date of Patent: Jul. 9, 1985

[54] METHOD AND DEVICE TO VARY THE IGNITION TIMING ANGLE TO AVOID PINGING IN AN INTERNAL COMBUSTION ENGINE

[75] Inventor: Serge Guipaud, Castelnaudary, France

[73] Assignee: Equipments Automobiles Marchal, Issy-les-Moulineaux, France

[21] Appl. No.: 406,979

[22] Filed: Aug. 10, 1982

[30] Foreign Application Priority Data

Aug. 11, 1981 [FR] France ................. 81 15543

[51] Int. Cl.³ .............................................. F02P 5/04
[52] U.S. Cl. ................................................... 123/425
[58] Field of Search ............ 123/416, 417, 425, 427, 123/435

[56] References Cited
U.S. PATENT DOCUMENTS

| | | | |
|---|---|---|---|
| 4,243,007 | 1/1981 | Ehrhardt et al. | 123/419 |
| 4,257,364 | 3/1981 | Sawada et al. | 123/425 |
| 4,268,910 | 5/1981 | Omori et al. | 364/431 |

FOREIGN PATENT DOCUMENTS

| | | |
|---|---|---|
| 0022159 | 5/1980 | European Pat. Off. . |
| 0030491 | 11/1980 | European Pat. Off. . |
| 75965 | 6/1981 | Japan ................. 123/425 |

Primary Examiner—Tony M. Argenbright
Attorney, Agent, or Firm—Brisebois & Kruger

[57] ABSTRACT

Pinging in an internal combustion engine is avoided by reducing the ignition advance angle, whenever pinging is detected, by a given angular retardation to arrive at a corrected advance angle. In the absence of pinging at said corrected advance angle, the angle of advance is progressively increased again stepwise at a first incremental rate of increase which is being maintained so long as the absence of pinging is maintained, up to a maximum cumulative increase; if this cumulative increase is attained without again detecting pinging the advance angle is increased stepwise at a second incremental rate until the normal advance angle value or the recurrence of pinging. At the time of transition from said first to said second incremental rate, said second incremental rate of increase is greater than or equal to said first incremental rate.

14 Claims, 3 Drawing Figures

METHOD AND DEVICE TO VARY THE IGNITION TIMING ANGLE TO AVOID PINGING IN AN INTERNAL COMBUSTION ENGINE

DESCRIPTION

1. Field of the Invention

The present invention relates to a method for varying the ignition timing angle in relation to the top dead centre (T.D.C.) to avoid so-called pinging (preignition) in an internal combustion engine. The invention also concerns a device for carrying out the method. More particularly, the invention concerns a method wherein, after the ignition advance relative to T.D.C. has been reduced on detection of pinging the angle of advance is progressively increased in the course of time with a variable incremental rate.

2. Prior Art

With a view to improving the overall efficiency of an internal combustion engine, it is known to endeavour to adjust the ignition advance in such a way as to obtain optimum engine efficiency. It has been found that, according to the operating conditions, this adjustment of the ignition advance may lead to the onset of pinging in at least one engine cylinder; the pinging generates highly undesirable vibrations in the moving engine parts and it is therefore necessary to avoid this pinging from its onset. It has, therefore, been proposed to dispose a vibration detector on the engine block which identifies the occurrence of pinging as the emission of a level of vibrations which is far greater than the base noise. The moment the pinging is thus detected, the ignition advance which was originally set according to the optimum engine efficiency, is reduced by a value which is sufficient to cause the pinging to cease. Of course, it is then necessary to bring back the ignition timing advance to its normal value, and this return must be effected as quickly as possible to prevent the engine from operating in an unfavourable efficiency range for an unduly long time. However, the return to the normal ignition advance cannot be instantaneous, otherwise the pinging would immediately recur. A compromise is therefore called for and in the prior art the reduced value of the ignition advance relative to T.D.C. is brought back to its normal value at a judiciously chosen incremental rate which, when expressed in degrees per second or in degrees per number of ignitions, is sufficiently high to prevent the engine from operating for an unduly long time at an unsatisfactory efficiency, and sufficiently small to prevent the pinging from occurring too frequently in the cylinder.

In the known way, at the time when pinging is detected, the ignition timing advance relative to T.D.C. is reduced by a certain angle and this reduction is increased up to the maximum value of the reduction, if the pinging continues. In the usual way, this maximum value is of the order of 20° C. If it is desired to avoid an unduly frequent pinging phenomenon in the cylinders it has been found difficult to make provision for an incremental rate of restoration of ignition advance of more than 0.5 degrees per second. It follows from this that in such a presently known device, the return to the normal ignition timing advance angle AN is obtained over a period of 40 seconds if the maximum retard or "back off" adjustment was made to stop the pinging. Now the causes of the pinging may quite well have disappeared well before the end of the above mentioned 40 second period, especially where the engine operating speed is subjected to very rapid changes. It follows that with the presently used method the engine operation is maintained in an adverse efficiency region during a period which is much longer than would be necessary for the suppression of the pinging.

SUMMARY OF THE INVENTION

It is an object of the present invention to mitigate the above mentioned drawbacks by using, for the return from the reduced ignition advance to the normal advance, an incremental rate which is not constant with respect to time. In accordance with the invention, when a corrected ignition advance value AC has been obtained where the pinging no longer occurs, the ignition advance is increased in the course of time, first of all, at an incremental rate $P_1$ expressed in degrees per second and then, provided it has been possible to maintain this first incremental rate for an adequate time without the occurrence of pinging, the ignition advance is increased at a second incremental rate $P_2$ which is higher than the first rate. In this way, it will be found that the time of returning to the normal ignition advance is considerably reduced in relation to that obtained with the prior art device. It should be noted that if the incremental ignition advance is operated from a corrected ignition advance value AC up to the normal advance value AN by constant incremental stages, for instance by 1°, the increase of the incremental rate corresponds to an increase in the frequency of the elementary increments affecting the advancing ignition timing.

A first aspect of the present invention therefore provides in a method for modifying the ignition timing angle in relation to the top dead centre to avoid pinging in an internal combustion engine, wherein whenever pinging is detected the ignition advance angle is reduced by a given angular retardation to no less than a predetermined minimum advance angle, to arrive at a corrected advance angle corresponding to an absence of pinging and wherein, in the absence of pinging at said corrected advance angle, the angle of advance is progressively increased from said corrected value to the value corresponding to the normal ignition advance angle value AN, the improvement wherein:

(a) starting from said corrected advance angle value, the advance angle is increased stepwise in the course of time at a first incremental rate of increase which is being maintained so long as the absence of pinging is maintained, up to a maximum cumulative increase $I_O$; and (b) if, starting with said corrected advance angle value, the cumulative increase $I_O$ is attained without again detecting pinging the advance angle is increased stepwise in the course of time at a second incremental rate until said normal advance angle value or the detection of recurrence of pinging, wherein said second incremental rate of increase is no less than said first incremental rate prevailing at the time of transition from said first to said second incremental rate.

In a first mode of implementation of the method according to the invention, the first and second incremental rates($P_1$ and $P_2$) are chosen with constant values with $P_2 > P_1$.

In a second mode of implementation of the invention, the second incremental rate ($P_2$) is chosen with a constant value and the first incremental rate ($P_1$) has a value variable according to the number of detections of pinging from the time of establishing the corrected advance (AC) based on the advance angle value (AN); in this case, provision is advantageously made to cause rate $P_1$ to decrease from its initial incremental rate value (Pi) to a minimum incremental rate value (Pm), the decrease being effected in a discontinuous manner on each detection of pinging, and to bring back $P_1$ to its value Pi at the time when the second incremental rate $P_2$ is adopted; preferably, the decrease in the first incremental rate $P_1$ is effected on each detection of pinging by dividing $P_1$ by a constant coefficient n; one may choose n=2.

One may choose Pi=$P_2$ in which case, if the incremental increase of the ignition advance angle on the basis of the corrected advance angle value AC is effected without the occurrence of pinging until the cumulative total increase $I_O$ is attained with the initial incremental rate of value Pi, the increase is subsequently continued at the second incremental rate $P_2$ which is equal to the preceding incremental rate so that the return to the normal advance angle value is effected with a single constant numerical value of the incremental rate expressed in degrees per second which, in this particular operating case, then conforms with the prior art. In practice, the second incremental rate $P_2$ is chosen to be sufficiently high so that this operational case is unlikely. In particular, one may choose Pm=Pi/8 so that the first incremental rate of increase $P_1$ may take, if divided by 2 on each variation, four successive distinct values. Advantageously, the choice may be $P_2$=4 degrees /second and $I_O$=5 degrees and 1° may be taken as the incremental step for the advance.

In the known way, in the case of pinging when the advance angle value is normal, one passes from the normal advance angle value AN to the corrected advance angle value AC by way of an initial decrease ($D_O$) followed, at each power stroke while pinging continues, by successive decrease increments ($D_1$) which are smaller than $D_O$ until a total maximum decrease (Dm) is reached. One may choose $D_1$=$D_O$/2; advantageously, one takes $D_O$=8 degrees and Dm=20 degrees. If pinging occurs while the advance angle is less than the normal advance angle value AN, the ignition advance is reduced by a constant decrease increment value $D_2$; one may choose $D_2$=4 degrees.

A second aspect of the present invention provides a new industrial product constituted by an anti-pinging ignition device for an internal combustion engine comprising a pinging detector; an ignition advance circuit associated with an ignition device for internal combustion engines; and means for transmitting the data from the pinging detector to a microprocessor programmed to implement the method of the first aspect of the invention, the said micro-processor being effective to send signals to the ignition advance circuit corresponding to the decrease and increase increments of the ignition advance angle.

The advance circuit may be independent of the microprocessor, but in a variant it may form part thereof.

Provision may advantageously be made for the detection of the pinging and the correction of the ignition advance angle to be effected cylinder by cylinder.

BRIEF DESCRIPTION OF THE DRAWINGS

In order that the present invention may more readily be understood there will now be described two modes of implementation, shown in the attached drawings by purely illustrative and non-restrictive examples. In these drawings.

PREFERRED EMBODIMENTS OF THE INVENTION

Figure 3:
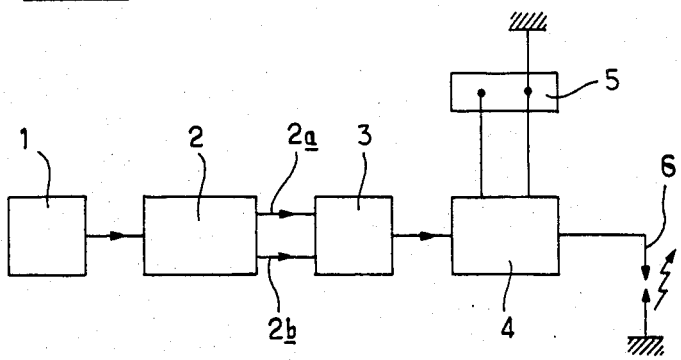
FIG. 3 is a block circuit diagram of a device for carrying out the method according to the invention, this device corresponding both to the said first and second modes of implementation of the method.

Referring to FIG. 3, there will be seen a pinging detector 1 comprising a vibration detector fixed on the engine block of a motor vehicle. This pinging detector sends data to the microprocessor 2 to indicate whether or not there is any pinging in the engine cylinder which is on the power stroke. Microprocessor 2 gives, to an ignition advance circuit 3, instructions in the case of increments via line 2a, and via line 2b in the case of decrements, in the angle of ignition advance. The advance circuit 3 is connected to an ignition circuit 4 powered by battery 5 of the vehicle, the ignition circuit 4 supplying high voltage current to the plugs 6 of the engine cylinders. The microprocessor 2 is programmed so that the increase or the decrease of the ignition advance angle should be calculated on the basis of a pinging signal as defined in the method according to the invention. Of course, as a variant, the ignition advance circuit could form part of the microprocessor itself, suitably programmed for this purpose.

Figure 1:
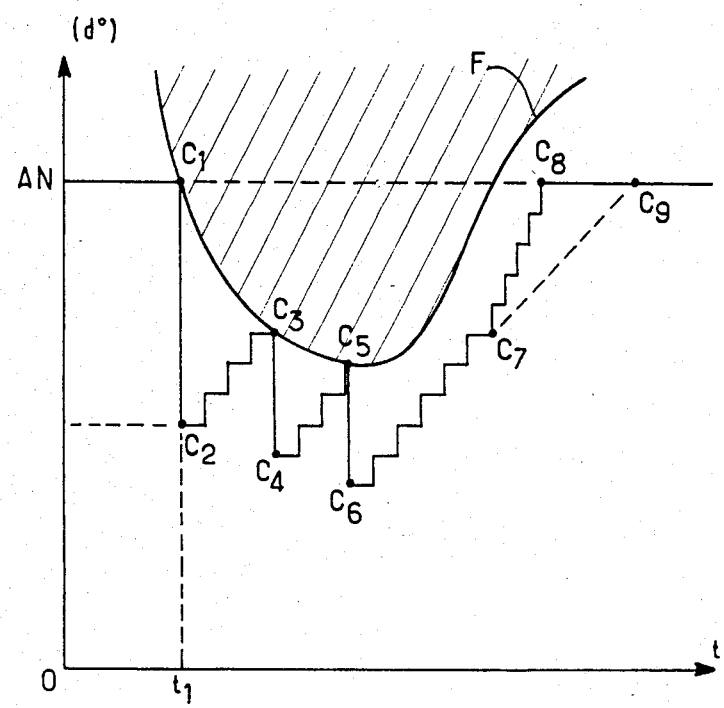
FIG. 1 is a graph showing as ordinate the angle of ignition advance relative to T.D.C., expressed in degrees, and, as abscissa, the time; this graph corresponding to a first mode of implementation of the method of the invention.

FIG. 1 represents the first mode of implementation of the method according to the invention. In this mode of implementation, the first incremental rate $P_1$ is 0.5°/second and the second incremental rate $P_2$ is 2.5°/second. The increments in the ignition advance are effected in steps of 1°, that is to say that for the first rate of incrementation an incremental stage is effected every two seconds whilst for the second rate $P_2$, an incremental stage is effected every 0.4 seconds. The accumulated increase $I_O$ which must be attained before the transition from the first incremental rate to the second incremental rate, has been taken as 5°, that is to say, five incremental steps at the first rate $P_1$ must be effected to make it possible to pass to the second rate $P_2$.

In FIG. 1, it will be seen that the normal advance angle (relative to T.D.C.) has been designated AN and that the engine operation is subject to a pinging curve F, the pinging zone being the shaded zone bounded by curve F. If at time $t_1$. operating at the normal advance angle AN results in the occurrence of pinging (point $C_1$ of curve F), the microprocessor 2 orders a decrease of 8° in the ignition advance angle so that the engine operating point comes to $C_2$. On the basis of this corrected ignition advance angle corresponding to point $C_2$, the ignition advance angle is then caused to increase by an increment of 1° every two seconds; after 8 seconds of operation three increments have been effected to arrive at point $C_3$ and the pinging reappears. The microprocessor 2 then gives the order to decrease the advance by 4° so that the engine operating point comes to $C_4$. The microprocessor 2 is programmed in such a way that all subsequent occurrences of pinging entail a 4° decrease in the ignition advance angle until the advance angle has been decreased by 20° in relation to the AN value, in which case, the corrected advance angle will be maintained at the value (AN−20°).

Starting from Point $C_4$, the ignition advance angle is again increased with the same incremental rate $P_1$ as before, and pinging is again reached at the end of three increments (point $C_5$): the ignition advance angle is then again decreased by 4° and one arrives at the operational point $C_6$ of the graph. An incremental increase in the advance angle is then again resumed over zone ($C_6$, $C_7$) with the incremental rate $P_1$ and it will be seen that five successive increments may be effected without any pinging. The higher incremental rate $P_2$ can then be adopted by producing an increment of 1° every 0.4 seconds corresponding to the part ($C_7$, $C_8$) of the graph. At point $C_8$, the normal value of advance AN is again reached and the ignition advance angle can then be maintained at the AN value.

If the operating conditions of the engine had instead been such that the normal ignition advance angle AN remained constant throughout the whole operating time represented in the graph of FIG. 1, the method of the present state of the art would have led to a return to the normal advance at point $C_9$ constituted by the intersection of the horizontal line ($C_1$, $C_8$) with inclined line ($C_6$, $C_7$). It will therefore be seen that in order to return to the normal ignition advance angle the method according to the invention makes it possible to gain the time corresponding to the segment ($C_8$, $C_9$), which corresponds to an increase in the average engine operating efficiency.

Figure 2:
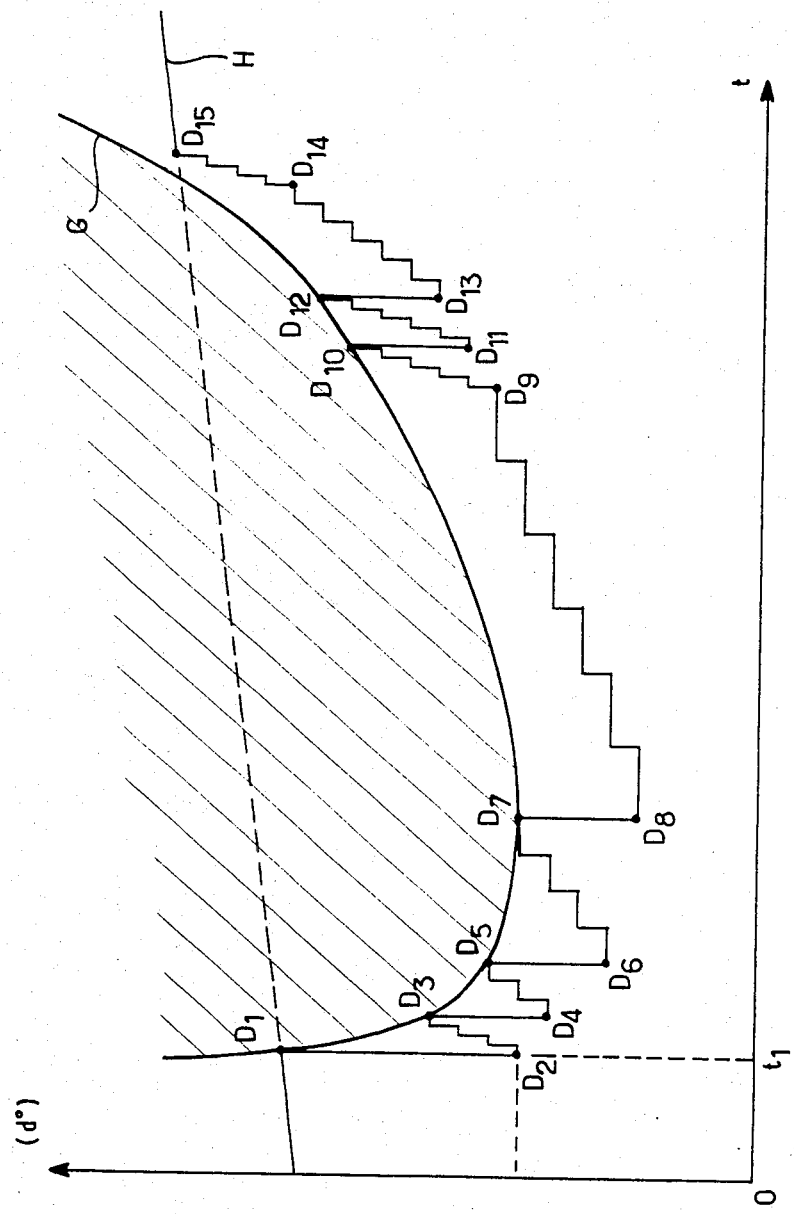
FIG. 2 is a graph which is analogous to that of FIG. 1, but corresponding to the second mode of implementation of the method according to the invention

FIG. 2 is a graph corresponding to the second mode of implementation of the method according to the invention. In this graph, G designates the curve which delimits the shaded pinging zone. For an example of the application of the method which is represented in this graph, it has been supposed that throughout the whole time corresponding to the graph, the operating conditions of the engine were such that the normal ignition advance angle AN was increasing along curve H. At time $t_1$, the pinging detector 1 signals the existence of pinging, which corresponds to point $D_1$ of the graph. The microprocessor 2 then imposes an 8° decrease from the normal ignition advance angle, which leads to point $D_2$. As in the preceding case, all the subsequent decreases in the advance will have a value of 4° and the reduction in the ignition advance angle will have a ceiling of 20° in relation to the value AN of the normal ignition advance angle.

From the operating point $D_2$, the value of the ignition advance angle is increased with a first incremental rate $P_1$ of 4 degrees/second; all the increments of the ignition advance angle are effected in 1° stages. This initial value of rate $P_1$ corresponds to the operating segment $D_2$, $D_3$ on the graph. It will be seen that after three increments, the pinging curve G is again reached at point $D_3$ and the ignition advance angle is therefore decreased by 4° to arrive at the operating point $D_4$. Since using the originally chosen incremental rate $P_1$ (a value of Pi=4°/second) has caused pinging to appear, a lower value of Pi is now adopted (obtained by dividing the preceding value by 2). An incremental rate of 2°/second in the advance angle is therefore effected which corresponds to the operating zone $D_4$, $D_5$ of the graph. It will be seen that after two incremental steps the pinging curve G is again reached at $D_5$. A new reduction of 4° in the advance angle is therefore effected which leads to the operating point $D_6$ of the graph. Since with the incremental rate $P_1$ previously used, pinging still remains, the incremental rate $P_1$ is again divided by 2 to bring its value to 1°/ second: this corresponds to an incremental step of 1° effected every second. It will be found that in the course of the fourth incremental step, the pinging curve G is again reached at $D_7$ and the advance angle is therefore again decreased by 4°, leading to the operating point $D_8$ of the graph. The subsequent incremental rate $P_1$ is chosen to be equal to half of the preceding rate because pinging has again occurred. The rate is therefore now equal to 0.5°/second which corresponds to an incremental step every 2 seconds. This value of the first incremental rate $P_1$ is deemed to be a minimum, and therefore even if pinging occurs subsequently before use of this rate $P_1$ has resulted in a cumulative increase $I_O$ chosen as equal to 5°, this same minimum rate $P_1$ of 0.5°/second will be retained for the subsequent increase in the ignition advance angle. In the case of the example represented in FIG. 2, it will be seen that the incremental rate $P_1$ corresponds to region $D_8$, $D_9$ and it will be seen that over this region five successive incremental steps are effected so that the cumulative increase $I_O$ is reached. In this case, the incremental rate $P_1$ is abandoned for the increase of the advance and the incremental rate $P_2$ is adopted which, in this example is chosen as equal to 4°/second. Thus the operating zone ($D_9$, $D_{10}$) is obtained and it will be found that before returning to the normal value AN of the ignition angle the pinging curve G will again be reached at $D_{10}$.

As the incremental rate $P_1$ is abandoned, at the transition to the incremental rate $P_2$, the microprocessor 2 has in fact reinstated the initial value of $P_1$ and has therefore restored it to be equal to Pi, that is to say, 4°/second. When the operating point $D_{10}$ is reached, the ignition advance angle is reduced by 4° which leads to the operational point $D_{11}$, and then the advance angle is caused to increase again at the first incremental rate $P_1$ whose value has been previously reintroduced. In view of the numerical values chosen it will be seen that, in this case, the incremental rate along graph segments ($D_9$, $D_{10}$) and ($D_{11}$, $D_{12}$) is the same, but the segment ($D_{11}$, $D_{12}$) corresponds to an incremental rate which in fact has the initial or primary value $P_1$ whilst the segment ($D_9$, $D_{10}$) having the same numerical value in fact corresponds to the value of the second incremental rate $P_2$. In the graph, it will be seen that in the course of the fifth incremental step effected from point $D_{11}$, the pinging curve G has again been reached at $D_{12}$ so the advance angle is decreased by 4° to arrive at point $D_{13}$ and, from this point, one uses a first incremental rate $P_1$ whose value is equal to half that of the preceding rate $P_1$, that is to say, equal to 2°/ second. It will be found on the graph that this corresponds to the segment ($D_{13}$, $D_{14}$) and that five successive incremental steps are effected without producing pinging. One has thus reached the predetermined cumulative increase $I_O$ for transition to the second incremental rate $P_2$ whose constant value is 4°/second. It will be seen on the graph that this second incremental rate is maintained, without encountering pinging, until the normal advance angle value AN is resumed at point $D_{15}$. If pinging were subsequently to recur, the ignition advance angle would be decreased by 8° and the process described above would be recommenced.

It will be seen that the adoption of this second mode of implementation of the method according to the invention makes it possible to follow the pinging curve most closely even if this curve corresponds to temporary speeds of short duration. Thanks to this mode of implementation, it is therefore possible to improve the total engine efficiency still further, even in the case of rapid changes of engine speed.

It shall be duly understood that the modes of implementation described above are in no way restrictive and may give rise to any desirable modifications without thereby departing from the scope of the invention as defined in the claims.

I claim:

1. In a method for modifying the ignition timing angle in relation to the top dead centre to avoid pinging in an internal combustion engine, wherein whenever pinging is detected the ignition advance angle is reduced by a given angular retardation to no less than a predetermined minimum advance angle, to arrive at a corrected advance angle corresponding to an absence of pinging and wherein, in the absence of pinging at said corrected advance angle, the angle of advance is progressively increased from said corrected value to the value corresponding to the normal ignition advance angle value AN, the improvement wherein:
   (a) starting from said corrected advance angle value, the advance angle is increased stepwise in the course of time at a first incremental rate of increase which is being maintained so long as the absence of pinging is maintained, up to a maximum cumulative increase; and
   (b) if, starting with said corrected advance angle value, the maximum cumulative increase is attained without again detecting pinging the advance angle is increased stepwise in the course of time at a second incremental rate until said normal advance angle value or the detection of recurrence of pinging, wherein said said second incremental rate of increase is no less than said first incremental rate prevailing at the time of transition from said first to said second incremental rate.

2. A method according to claim 1, wherein said first and second incremental rates are constant and not equal to one another.

3. A method according to claim 1, wherein said second incremental rate has a constant value and said first incremental rate has a value which is variable according to the number of detections of pinging since the said corrected advance angle has been established based on the normal value of the advance angle.

4. A method according to claim 3, wherein said first incremental rate has an initial value from which it is caused to decrease down to a minimum value of the first incremental rate, the decrease being effected in a discontinuous manner on each detection of pinging, and wherein said first incremental rate is restored to its said initial value upon resumption of said first incremental rate after a said reduction in the advance angle following an increase at said second incremental rate.

5. A method according to claim 4, wherein the decrease of said first incremental rate on each detection of pinging is effected by dividing said first incremental rate by a constant factor.

6. A method according to claim 5, wherein said constant factor is 2.

7. A method according to any one of claims 4 to 6, wherein said initial value of said first incremental rate is equal to said second incremental rate.

8. A method according to any one of claims 4 to 6, wherein said minimum value of said first incremental rate is one eighth of said initial value of said first incremental rate.

9. A method according to any one of claims 2 to 6, wherein said second incremental rate has a value of about 4° per second, wherein said maximum cumulative increase is about 5°, and wherein each incremental step of the increase of advance angle is about 1°.

10. A method according to any one of claims 1 to 6, comprising the step of decreasing the advance angle from said normal advance angle to said corrected advance angle value if pinging is detected whilst the advance angle has said normal value, said decrease being through a first decrease interval followed at each power stroke of each cylinder while the pinging is maintained, by successive decreases having decrease intervals which are smaller than said first interval until a maximum total decrease is attained.

11. A method according to claim 10, wherein said further decrease interval is equal to one half of said first decrease interval.

12. A method according to claim 10, wherein said first decrease interval is approximately 8° and said maximum total decrease is approximately 20°.

13. A method according to any one of claims 1 to 6, wherein, if pinging is detected while the ignition advance angle is lower than said normal ignition advance angle value, the advance angle is reduced by a constant decrease value.

14. A method according to claim 13, wherein said constant decrease value is approximately 4°.

* * * * *